July 21, 1925.
L. G. WELLDE
ARMORING MEANS
Filed Feb. 6, 1922
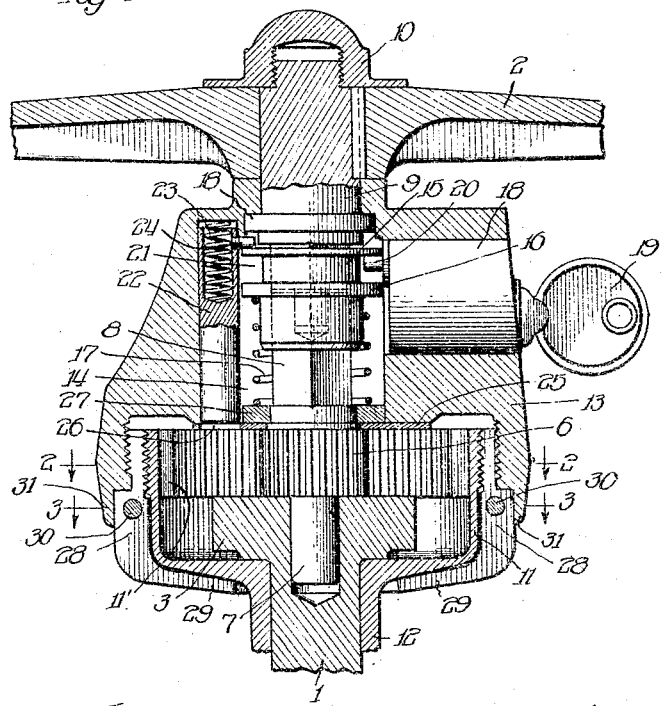
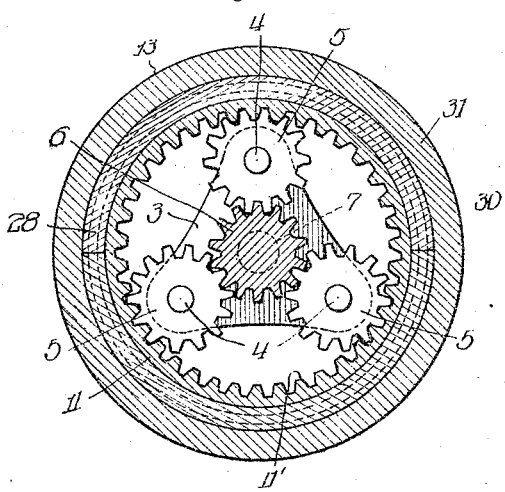
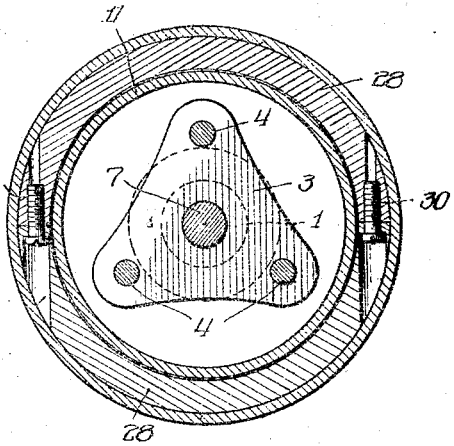
Witness:
R. Burkhardt.
Inventor:
Louis G. Wellde,
By Wilkinson, Huxley, Byron & Knight
Attys Patented July 21, 1925.

1,546,957

UNITED STATES PATENT OFFICE.

LOUIS G. WELLDE, OF CHICAGO, ILLINOIS, ASSIGNOR TO RICHARD M. DECKER COMPANY, OF CHICAGO, ILLINOIS, A COPARTNERSHIP CONSISTING OF RICHARD M. DECKER, F. B. HARRIMAN, H. M. DECKER, S. P. HARRIMAN, AND L. M. HARRIMAN.

ARMORING MEANS.

Application filed February 6, 1922. Serial No. 534,432.

*To all whom it may concern:*

Be it known that I, LOUIS G. WELLDE, a citizen of the United States, residing at Chicago, in the county of Cook and State of Illinois, have invented certain new and useful Improvements in Armoring Means, of which the following is a specification.

The present invention relates to armoring means. More particularly the present invention relates to means for safeguarding the locking mechanism of a motor car, whereby when said mechanism is in condition to lock the motor car against operation, said mechanism will be protected against attack and manipulation by unauthorized persons.

The present invention will be described with reference to motor cars of the Ford type and is particularly useful in connection with the locking mechanism commonly used upon the upper part of the steering column of this type of car. As is well known, the upper end of the steering column of cars of the Ford type is provided with a cup-shaped portion containing planetary gears which co-operate with a sun gear in transmitting steering motion from the steering wheel to the steering post. Various devices have been evolved for selectively rendering inoperative the steering mechanism when it is desired to lock the car against operation. Such devices may operate in response to a lock and key, or to a combination or permutation lock, or to any other preferred type of locking mechanism. Such devices may operate to make and break an operative connection between the steering wheel and said planetary gearing, or may operate to positively hold said planetary gearing, or the parts connected thereto, against operative movement. The effectiveness of many of the locking means as now known and used may be nullified if access may be had to the interior of said cup-shaped portion of the steering column. As will be apparent as the description proceeds, the present invention prevents access to said cup-shaped portion and increases the effectiveness of any of the above types of locking mechanism.

An object of the present invention is to provide armoring means for the locking mechanism of motor cars.

A further object is to provide combined armoring and locking means which, with the exercise of a minimum of skill and discretion, may be applied to cars already in service as well as to new cars.

A further object is to provide armoring means which will combine with existing designs of locking mechanism to protect said locking mechanism against attack by unauthorized persons.

A further object is to provide armoring means for cars of the Ford type which will effectually protect the planetry steering gears, and any locking mechanism co-operating therewith, against attack by unauthorized persons.

A further object is to provide armoring means responsive to locking mechanism, which armoring means may be readily installed or removed by an authorized person but will effectually baffle unauthorized persons.

Further objects will appear as the description proceeds.

Referring to drawings—

Figure 1 is a sectional view taken along the axis of a steering column of a motor car;

Figure 2 is a sectional view taken along the lines 2—2 of Figure 1;

Figure 3 is a sectional view taken along line 3—3 of Figure 1.

The numeral 1 indicates a steering post which at its lower end may be connected to the steering mechanism of a car (not shown). The numeral 2 indicates a steering wheel, which may be connected to said steering post 1 for communicating steering motion thereto. The upper end of the steering post 1 is provided with a spider 3, which is provided with a plurality of upstanding pins 4—4 upon which are mounted the planetary gears 5—5. Said planetary gears are mounted to engage with a sun gear 6, which is provided with a downwardly extending cylindrical pin 7 adapted to ride in a corresponding recess at the top of the steering post 1. Steering is accomplished by transmitting steering motion from the steering wheel 2 to the sun gear 6.

According to the structure illustrated, the sun gear 6 is provided with an upstanding stud 8, which may be of angular cross section and which is adapted to have operative driving relation with the shaft 9 to which is keyed the steering wheel 2. The shaft 9 may be screw-threaded at its upper end for the reception of a nut 10 which serves to hold the steering wheel 2 against vertical movement.

The top of the steering post 1 and the planetary gears 5—5 and sun gears 6 are mounted within the cup-shaped member 11 at the top of the steering column 12, which steering column 12 encases the steering post 1. The cup-shaped member 11 is provided with an internal gear 11' with which mesh the planetary gears 5—5. Said cup-shaped member 11 supports the cap 13, certain novel means being mounted between said cup-shaped member 11 and cap 13, the purpose and functions of which will be described hereinafter.

The cap 13, which will preferably be of hardened steel, forms a cover for the cup-shaped member 11 and provides a housing for the locking mechanism which controls the operative relation between the stud 8 of the sun gear 6 and the shaft 9 to which the steering wheel 2 is attached.

The cap 13 is provided with a bore, indicated by the numeral 14, which receives the stud 8 and the parts co-operating therewith. The lower end of the shaft 9 is provided with a portion of angular cross section, indicated by the numeral 15, to correspond to the cross section of the stud 8. Said shaft 9 and stud 8 are adapted to be connected or disconnected in response to movement of the coupling member 16, which is provided with a central longitudinal hole shaped to conform to the angular cross section of stud 8 and shaft 9. According to the present disclosure, said coupling member 16 is urged upwardly by means of the spring 17 to a position to couple the stud 8 and shaft 9. When the coupling member 16 is moved downwardly against the tension of spring 17, it will be disengaged from the end of the shaft 9, whereby said shaft 9 and steering wheel 2 may rotate freely without effecting rotation of the stud 8. As will be noted from Figure 1, the shaft 9 may be provided with a collar 18 adapted to underlie the under side of the cap 13, thereby forming an abutment to prevent vertical movement of the shaft 9 and steering wheel 2.

Mounted in the cap 13 is the lock 18, which may be controlled by the key 19. Said lock 18 may have a pin 20, whose position varies in response to operation of the key 19. Said pin 20 may ride in a circumferential slot 21 in the coupling member 16 and may communicate vertical movement to said coupling member. When the key 19 is turned so as to move the pin 20 downwardly, said pin 20 will carry with it the coupling member 16, thereby removing the coupling member 16 from engagement with the shaft 9 and disconnecting the steering wheel from operative relation with the stud 8 of the sun gear 6.

The cap 13 is provided with screw-threads whereby said cap 13 may be conveniently mounted in operative relation with the cup-shaped member 11 or dismounted therefrom. For the purpose of preventing removal of the cap 13 by unauthorized persons, the following structure may be provided: Mounted within the cap 13 in parallel relation with the axis of the bore 14 is the vertically reciprocable pin or abutment member 22, which may be normally biased downwardly by the spring 23. Said member 22 is provided with a laterally extending stud 24 engaging with the coupling member 16. When coupling member 16 is moved to its upper position, which is the operative driving position, said coupling member, by reason of its engagement with the stud 24 of the pin 22, will hold said pin in its uppermost position. It will be found good practice to have the spring 17 of greater strength than the spring 23, whereby when it is desired to lock the car after same has been unlocked, it will be necessary only to move the key 19 a sufficient distance to move the pin 20 off vertical dead center, after which the spring 17 will bias the coupling member 16 upwardly. A slight rotation of the steering wheel will ensure the proper engagement of coupling member 16 with the shaft 9 of said steering wheel. When the coupling member is in its lowermost position, i. e., uncoupling position, the member 22 will occupy its lowermost position between the planetary gears 5—5. Even though the car should be left with the planetary gears in such a position that the pin 22 will not fall between said gears, any attempt to turn the cap 13 or to steer the car without first having manipulated the coupling member 16 will cause the pin 22 to fall between the gears and prevent further turning of the cap 13. A washer 25 may be provided on the under side of the cap 13, said washer being provided with a hole 26 to receive the reciprocating member 22. Said washer 25 will constitute an abutment for the ring 27 which, in turn, abuts one end of the spring 17.

The cup-shaped member 11 and cap 13 have mounted between them certain armoring means, which will now be described. The cup-shaped member 11 of cars of the Ford type is screw-threaded on its outside. Armoring mechanism comprising two half rings 28—28 split along a diameter is provided, which half rings 28—28 are provided with internal screw-threads adapted to engage with the external screw-threads on the cup-shaped member 11. Said half rings 28—28 are also provided with external screw-threads adapted to receive the internal screw-threads on the cap 13. Said half rings 28—28 will preferably be of hardened steel and will, when assembled with one another, provide a cup-shaped structure having the integral bottom portions 29—29 adapted to underlie the bottom of the cup-shaped member 11. Said half rings 28—28 are assembled upon the cup-shaped member 11 with the internal screw-threads of said half rings engaging with the external screw-threads of the member 11, said half rings being held in assembled position by the screws 30—30 which lie along lines tangential to a circle having its center in the longitudinal axis of the cup-shaped member 11.

The illustrated means for assembling and holding the two half rings 28—28 on the cup-shaped member 11 have decided advantages, inasmuch as the two half rings may be conveniently drawn to proper fitting position. Inasmuch as the structure involved in the present invention is intended to be distributed to and installed by car owners who need have no particular mechanical skill, the wedging action produced by the screws 30—30 will permit proper assembly by unskilled persons, even though there may be slight differences between the screw-threads on the cup-shaped member 11 and the half rings 28—28. After the half rings 28—28 have been assembled upon the member 11, the cap 13 may be screw-threaded upon said half rings 28—28, forming a complete armor for the cup-shaped member 11 and for the steering mechanism and the locking means therefor.

The hardened steel cap 13 is provided with an integral depending skirt 31 which completely covers the screws 30—30 and effectually prevents manipulation of said screws when said cap 13 is in position.

It will be obvious without detailed description that the hardened steel cap 13 and the hardened steel armoring means 28—28 will baffle a thief in any attempt to pry into the cup-shaped member 11. The construction is relatively cheap to manufacture and may be assembled or disassembled by persons having a minimum of mechanical skill and discretion. The parts may not be disassembled when the car is in locked position but may be readily disassembled when said car is unlocked.

The invention is applicable to a great number of the locking mechanisms now known and used, being in no way limited to the locking mechanism illustrated.

One embodiment of the present invention has been described in detail. Many modifications will occur to those skilled in the art. It is intended in this patent to cover all such modifications that fall within the scope of the invention as defined by the appended claims.

I claim:

1. In combination, a steering wheel, a steering post, a steering column having a cup-shaped member at its upper end, steering mechanism within said cup-shaped member for communicating steering motion from said steering wheel to said post, armoring mechanism enclosing said cup-shaped member, said armoring mechanism comprising two complementary members fitted around and attached to said cup-shaped member, screws for holding said complementary members together, and a cap for said cup-shaped member mounted upon said complementary members, said cap having a portion for preventing access to said screws.

2. In combination, a steering column having a cup-shaped portion at its upper end, steering mechanism in said cup-shaped portion, armoring means for said cup-shaped portion mounted thereon and split axially of said cup-shaped portion, screws for screwing said armoring mechanism together, a cap screw-threaded upon said armoring means, said cap having a portion overlying and protecting said screws, locking mechanism, and means responsive to said locking mechanism for controlling the removability of said cap.

3. In combination, a steering column having a cup-shaped member, steering mechanism within said cup-shaped member, armoring mechanism surrounding and underlying said cup-shaped member, said armoring mechanism being composed of two separable parts split axially of said cup-shaped member, said separable members being held together by means of screws, and a cap for said cup-shaped member overlying and protecting said screws, locking mechanism, and means responsive to said locking mechanism for controlling the removability of said cap.

Signed at Chicago, Illinois, this 2nd day of February, 1922.

LOUIS G. WELLDE.